(12) United States Patent
Bartonek

(10) Patent No.: US 9,991,696 B2
(45) Date of Patent: *Jun. 5, 2018

(54) CRASHWORTHY MEMORY MODULE HAVING A THERMAL WIRING DISCONNECT SYSTEM

(71) Applicant: Progress Rail Services Corporation, Albertville, AL (US)

(72) Inventor: Mark Joseph Bartonek, Independence, MO (US)

(73) Assignee: Progress Rail Services Corporation, Albertville, AL (US)

( * ) Notice: Subject to any disclaimer, the term of this patent is extended or adjusted under 35 U.S.C. 154(b) by 575 days.

This patent is subject to a terminal disclaimer.

(21) Appl. No.: 14/331,678

(22) Filed: Jul. 15, 2014

(65) Prior Publication Data

US 2016/0018244 A1 Jan. 21, 2016

(51) Int. Cl.
*G01D 3/08* (2006.01)
*H02H 5/04* (2006.01)
*G01D 9/00* (2006.01)
*G01D 11/24* (2006.01)

(52) U.S. Cl.
CPC .............. *H02H 5/04* (2013.01); *G01D 9/005* (2013.01); *G01D 11/24* (2013.01)

(58) Field of Classification Search
CPC .......... H02H 5/04; H02H 5/041; G01D 11/24; G01D 9/005; G01D 3/08; H01L 23/3737; H01L 2224/01; H01L 2224/05198; H05K 2201/10159
USPC ....... 361/103, 104, 705, 708, 712, 718, 764, 361/679.31; 312/223.6
See application file for complete search history.

(56) References Cited

U.S. PATENT DOCUMENTS

| | | | |
|---|---|---|---|
| 4,189,697 A | 2/1980 | Hara | |
| 4,837,547 A | 6/1989 | Nixon et al. | |
| 5,696,348 A * | 12/1997 | Kawamura | G01K 1/125 136/201 |
| 5,845,272 A | 12/1998 | Morjaria et al. | |

(Continued)

OTHER PUBLICATIONS

U.S. Patent Application of Mark Joseph Bartonek, entitled "Crashworthy Memory Module Having a Crack Repair System", filed Jul. 15, 2014.

(Continued)

*Primary Examiner* — Jerry Wu
*Assistant Examiner* — Stephen Sul
(74) *Attorney, Agent, or Firm* — Finnegan, Henderson, Farabow, Garrett & Dunner, LLP

(57) ABSTRACT

A memory module is disclosed. The memory module may have an enclosure and a device disposed within the enclosure. The memory module may also have an orifice in a wall of the enclosure and a wire passing through the orifice. One end of the wire may be attached to the device. The memory module may further have a stopper attached to the wire. The stopper may be located abutting an outer surface of the enclosure. The memory module may also have a filler disposed within the enclosure. The filler may be configured to expand and be ejected out of the orifice when subjected to a threshold temperature. The filler may also be configured to push the stopper away from the outer surface and disconnect the wire from the device.

16 Claims, 4 Drawing Sheets

(56) References Cited

U.S. PATENT DOCUMENTS

| | | | | |
|---|---|---|---|---|
| 6,158,833 | A * | 12/2000 | Engler | E05G 1/024 |
| | | | | 109/83 |
| 6,924,027 | B2 | 8/2005 | Matayabas, Jr. et al. | |
| 7,206,505 | B2 | 4/2007 | Gasper | |
| 7,703,291 | B2 | 4/2010 | Bushnik et al. | |
| 8,981,220 | B2 * | 3/2015 | Fargano | H02G 3/081 |
| | | | | 174/50.52 |
| 9,484,164 | B2 * | 11/2016 | Bartonek | G01D 9/005 |
| 2003/0162387 | A1 | 8/2003 | Sandhu et al. | |
| 2009/0029574 | A1 * | 1/2009 | Nakano | H01R 12/712 |
| | | | | 439/83 |
| 2010/0001413 | A1 * | 1/2010 | Hiromoto | H01L 23/49517 |
| | | | | 257/784 |
| 2010/0182761 | A1 * | 7/2010 | Suzuki | H02S 40/34 |
| | | | | 361/807 |
| 2011/0286173 | A1 * | 11/2011 | Moore | G06F 1/187 |
| | | | | 361/679.31 |
| 2012/0300409 | A1 * | 11/2012 | Lee | F21V 29/20 |
| | | | | 361/721 |
| 2013/0070411 | A1 * | 3/2013 | Liang | G06F 1/185 |
| | | | | 361/679.31 |
| 2015/0361241 | A1 * | 12/2015 | Loomis | H05K 1/167 |
| | | | | 174/254 |

OTHER PUBLICATIONS

U.S. Patent Application of Mark Joseph Bartonek et al., entitled "Crashworthy Memory Module Having a Thermal Cutoff", filed Jul. 15, 2014.

* cited by examiner

CRASHWORTHY MEMORY MODULE HAVING A THERMAL WIRING DISCONNECT SYSTEM

TECHNICAL FIELD

The present disclosure relates generally to a crashworthy memory module and, more particularly, to a crashworthy memory module having a thermal wiring disconnect system.

BACKGROUND

Modern locomotives typically include one or more crashworthy memory modules or "black boxes" that record and communicate information including voice and image data and vehicle performance parameters received from event recorders or locomotive control computers. Data retrieved from a crashworthy memory module after an accident involving a locomotive can help reconstruct and provide a detailed and accurate accounting of events leading up to and during the accident. Crashworthy memory modules, therefore, store the recorded information in a crash-hardened memory unit designed and built to withstand the severe conditions that may occur during the accident.

An accident involving a locomotive may include fires caused due to spillage of fuel from the locomotive or from railroad cars attached to or located near the accident scene. A crashworthy memory module may be subjected to temperatures as high as 1400° F. because of such fires. Crashworthy memory modules are designed to withstand such high temperatures and smolder temperature as high as 500° F. for 10 hours or more without allowing the high temperatures to adversely affect electronic data stored within the crashworthy memory module. Although the crashworthy memory module and electronic components within the crashworthy memory module are heavily insulated, heat may still enter the crashworthy memory module through electrical wires connecting the electronic components within the crashworthy memory module to locomotive subsystems located outside the crashworthy memory module. To prevent damage to the electronic components that store data within the crashworthy memory module, it is important to prevent the heat from the fire from being conducted by the wires to the electronic components in the crashworthy memory module.

One attempt to address some of the problems described above is disclosed in U.S. Pat. No. 7,703,291 of Bushnik et al. that issued on Apr. 27, 2010 ("the '291 patent"). In particular, the '291 patent discloses an environmental control system for a hard drive of an event recorder. The disclosed thermoelectric module transfers heat between the hard drive and a housing of the event recorder, in response to an applied voltage, in order to maintain a hard drive temperature within a hard drive operable temperature range. The '291 patent also discloses an active thermoelectric controller for actively drawing heat away from the hard drive and out of the housing. The thermoelectric controller can include a heat sink coupled to the thermoelectric module and to the housing for dissipating heat from the thermoelectric module to the housing.

Although the '291 patent discloses a system for controlling the temperature of a hard drive of an event recorder, the disclosed system may still be inadequate. For example, the system of the '291 patent requires an applied voltage to control the hard drive temperature. After an accident, however, equipment which provides the applied voltage may not function rendering the thermal control system of the '291 patent inadequate. Further, the system of the '291 patent may not be able to prevent heat from a fire outside the event recorder from entering the event recorder through wires connected to the hard drive.

The crashworthy memory module of the present disclosure solves one or more of the problems set forth above and/or other problems in the art.

SUMMARY

In one aspect, the present disclosure is directed to a memory module. The memory module may include an enclosure and a device disposed within the enclosure. The memory module may also include an orifice in a wall of the enclosure and a wire passing through the orifice. One end of the wire may be attached to the device. The memory module may further include a stopper attached to the wire. The stopper may be located abutting an outer surface of the enclosure. The memory module may also include a filler disposed within the enclosure. The filler may be configured to expand and be ejected out of the orifice when subjected to a threshold temperature. The filler may also be configured to push the stopper away from the outer surface and disconnect the wire from the device.

In another aspect, the present disclosure is directed to a thermal wiring disconnect system for a device disposed within an enclosure. The thermal wiring disconnect system may include a stopper attached to a wire connected to the device. The wire may exit the enclosure through an orifice and the stopper may be located adjacent an outer surface of the enclosure. The thermal wiring disconnect system may also include a filler disposed within the enclosure. The filler may be configured to expand and be ejected through the orifice when subjected to a threshold temperature, push the stopper away from the outer surface, and disconnect the wire from the device.

In yet another aspect, the present disclosure is directed to a method of manufacture of a memory module. The method may include fabricating an enclosure. The method may also include fabricating an orifice in a wall of the enclosure. The method may further include connecting a first end of a wire to a device disposed within the enclosure and passing a distal end of the wire through the orifice. In addition, the method may include attaching a stopper to the wire such that the stopper abuts an outer surface of the enclosure. The method may also include providing a filler within the enclosure. The filler may be configured to expand and be ejected through the orifice, push the stopper away from the outer surface, and disconnect the wire from the device, when the filler is subjected to a threshold temperature.

DETAILED DESCRIPTION

Figure 1:
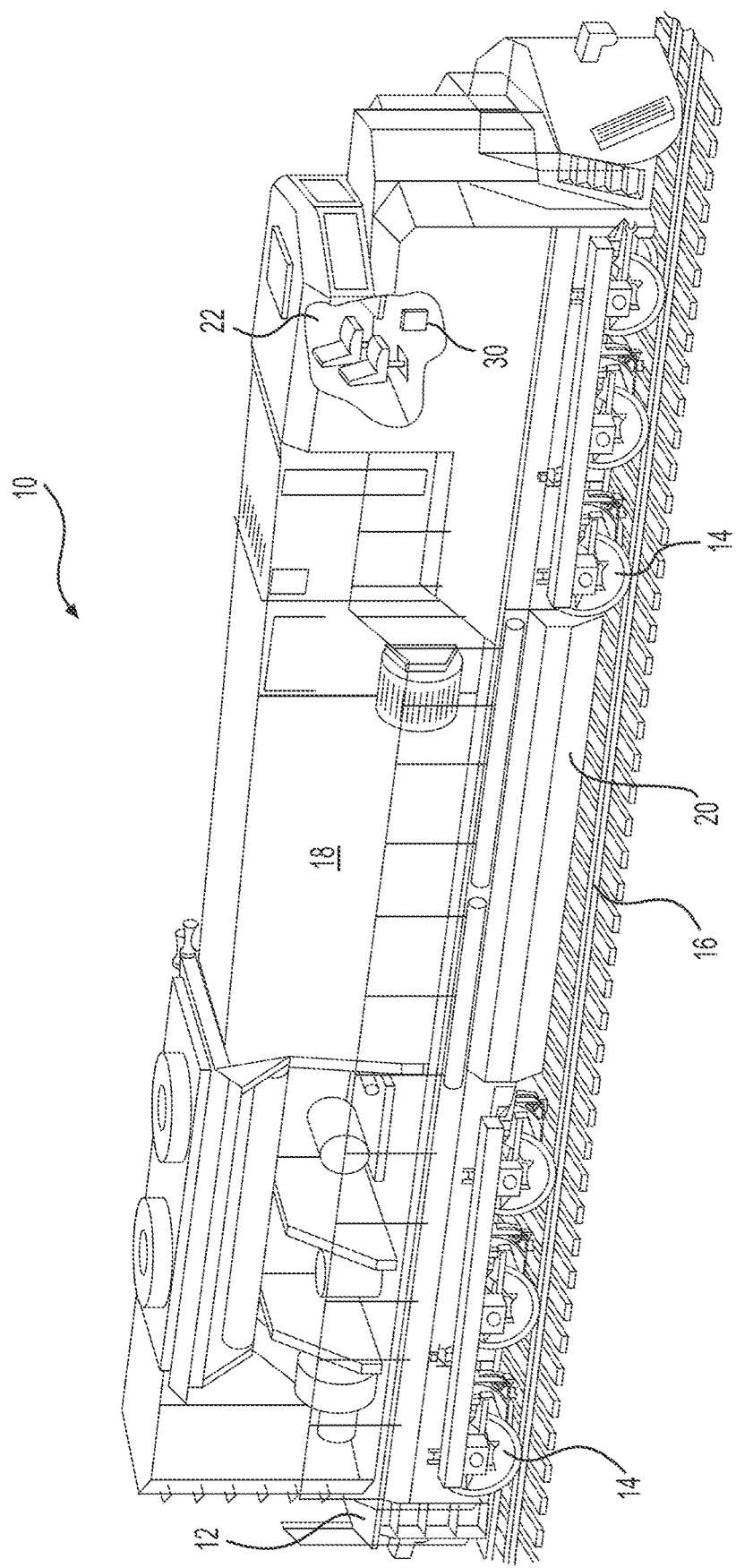
FIG. 1 is a pictorial illustration of an exemplary disclosed machine equipped with a memory module.

FIG. 1 illustrates an exemplary embodiment of a machine 10. For example, as shown in FIG. 1, machine 10 may be a locomotive designed to pull rolling stock. Machine 10 may have a platform 12 supported by a plurality of wheels 14, which may be configured to engage track 16. Wheels 14 may have traction motors (not shown) associated with them, which may drive wheels 14 to propel machine 10 in a forward or rearward direction.

Machine 10 may have an engine 18 mounted on platform 12. Engine 18 may be configured to receive fuel from fuel tank 20 and to drive one or more generators (not shown), which may generate power to drive the traction motors. Although FIG. 1 depicts one engine 18 and one fuel tank 20, it is contemplated that machine 10 may have more than one engine 18 and/or fuel tank 20. In one exemplary embodiment, as shown in FIG. 1, engine 20 may be lengthwise aligned on platform 12 along a travel direction of machine 10. One skilled in the art will recognize, however, that engine 20 may be located in tandem, transversally, or in any other orientation on platform 12. Machine 10 may also include operator cabin 22 from where an operator (not shown) may be able to control operations performed by machine 10. Although, FIG. 1 illustrates a locomotive, machine 10 may be any type of mobile machine including an automobile, an aircraft, a boat or a ship, or any other type of construction, mining, or farming machine known in the art.

Machine 10 may include one or more memory modules 30. Memory modules 30 may be crashworthy memory modules capable of surviving an accident or a crash. In one exemplary embodiment, memory module 30 may be configured to record operational parameters, input parameters, and/or a variety of data from one or more event recorders or control computers of machine 10. The various types of data may include video data and audio data, machine data indicative of one or more machine operating parameters, machine control signals, machine performance characteristics, and engine operating and performance data. Data may also include, for example, electrical data, exhaust characteristics, and positive machine control data indicative of an actual location of a machine, sound of a horn, voice recording of anything spoken by the an operator, actuation of a brake lever by the operator, a signal received from a GPS sensor, a change in throttle setting, a sudden change in exhaust characteristics, the position of the machine relative to a crossing, and the speed and acceleration or deceleration of the machine. As illustrated in FIG. 1, memory module 30 may be located in operator cabin 22 of machine 10. It is contemplated, however, that memory module 30 may be located anywhere on machine 10.

Figure 2:
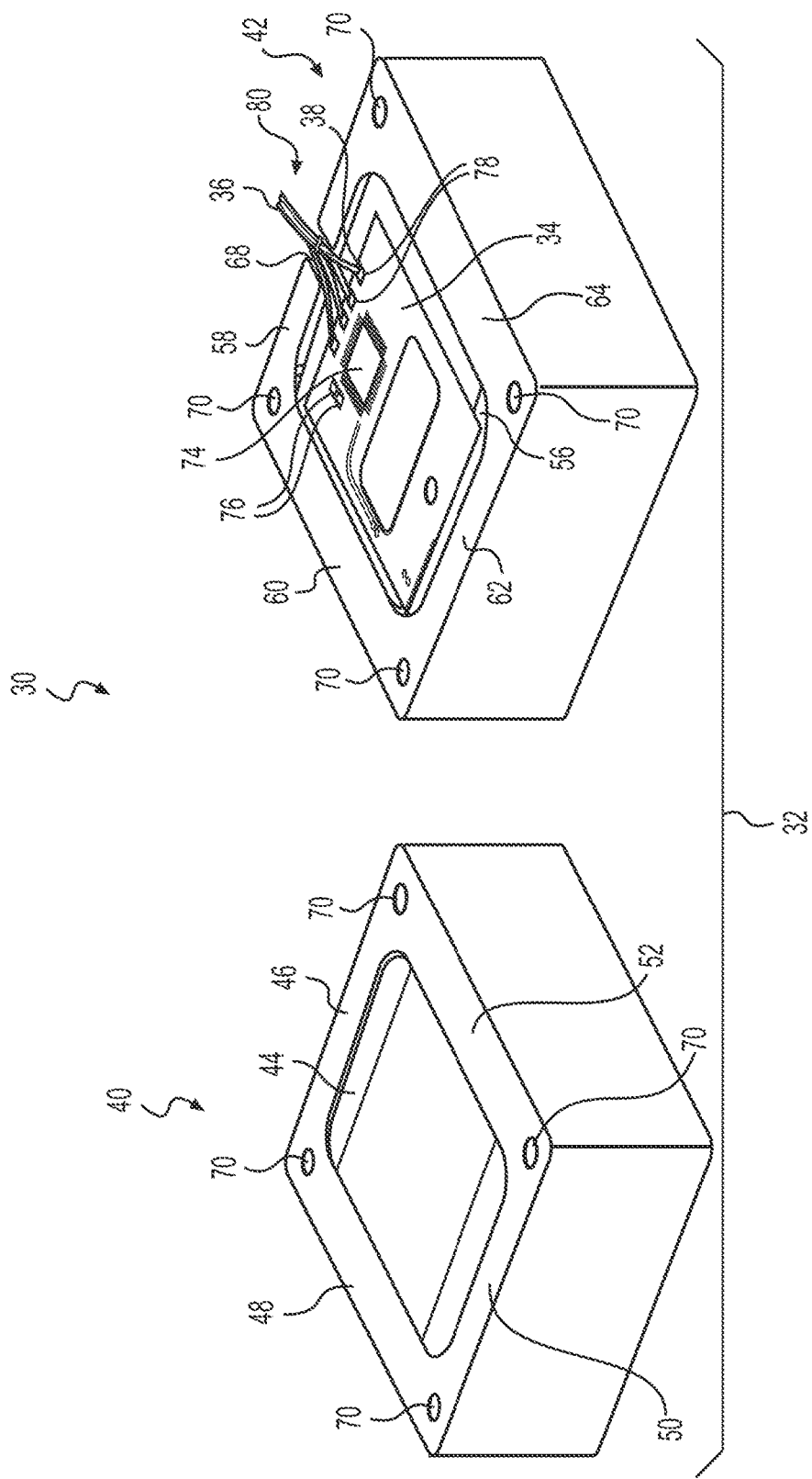
FIG. 2 is a diagrammatic view of an exemplary disclosed memory module, including a thermal wiring disconnect system, for the machine of FIG. 1.

FIG. 2 illustrates a diagrammatic view of an exemplary disclosed memory module 30 that includes thermal wiring disconnect system 80. As shown in the figure, memory module 30 may include an enclosure 32, device 34 and one or more wires 36 connected at one end 38 to device 34. Memory module 30 may have a rectangular or square shape. It is contemplated, however, that memory module 30 may have a circular, triangular, polygonal, or any other shape known in the art.

Enclosure 32 may include a top portion 40 and a bottom portion 42. Top portion 40 may have an upper recess 44, first side wall 46, second side wall 48, third side wall 50, fourth side wall 52, and top wall 54 (see FIG. 3). First, second, third, and fourth side walls 46, 48, 50, 52 and top wall 54 may have the same or different thicknesses. Further, the thicknesses of first, second, third, and fourth side walls 46, 48, 50, 52 and top wall 54 may be uniform or non-uniform over their respective surfaces. As illustrated in FIG. 2, bottom portion 42 may have a lower recess 56, fifth side wall 58, sixth side wall 60, seventh side wall 62, eight side wall 64, and bottom wall 66 (see FIG. 3). Fifth, sixth, seventh, and eighth side walls 58, 60, 62, 64 and bottom wall 66 may have the same of different thicknesses. Further, the thicknesses of fifth, sixth, seventh, and eighth side walls 58, 60, 62, 64 and bottom wall 66 may be uniform or non-uniform over their respective surfaces. Upper recess 44 and lower recess 56 may have a square or rectangular shape. It is contemplated, however, that upper recess 44 and lower recess 56 may have a circular, triangular, polygonal, or any other shape known in the art. In one exemplary embodiment, enclosure 32 may have a length of about 2.0 to 2.5 inches, a width of about 1.5 to 2.0 inches, and a height of about 1 inch. In another exemplary embodiment, the thickness of side walls 46, 48, 50, 52, 58, 60, 62, 64 may be about 0.325 to 0.500 inches. In yet another exemplary embodiment, the thicknesses of top wall 54 and bottom wall 66 may be about 0.225 to 0.250 inches. The terms "top," "bottom," "upper," and "lower" as used in this disclosure merely distinguish features associated with the top and bottom portions 40, 42 of memory module 30 and should not be interpreted to mean that top and bottom portions 40, 42 and/or memory module 30 are disposed in machine 10 in any particular orientation.

Bottom portion 42 may also include orifice 68 through which wires 36 may pass into or out of enclosure 32. As illustrated in FIG. 2, orifice 68 may be a slot or a hole made in side wall 58 of bottom portion 42. It is contemplated, however, that orifice 68 may be disposed on any of side walls 46, 48, 50, 52, 58, 60, 62, 64, top wall 54, and/or bottom wall 66 of top and/or bottom portions 40, 42. Although FIG. 2 illustrates only one orifice 68, it is contemplated that enclosure 32 may have any number of orifices 68. Orifice 68 may be circular, elliptical, slotted, or may have any other shape known in the art. Orifice 68 may have a size sufficiently large to allow wires 36 to pass through orifice 68. In one exemplary embodiment, orifice 68 may have a diameter about 5 to 10 thousandths of an inch larger than a combined diameter of wires 36 passing through orifice 68. In another exemplary embodiment, wire 36 may have a diameter of about 32 gage and orifice 68 may have a diameter of about 0.125 inches.

Top portion 40 and bottom portion 42 may also include one or more holes 70 which may be used to attach top portion 40 with bottom portion 42 via, for example, nuts and bolts, screws, rivets, or any other types of connectors known in the art. Holes 70 may be circular, elliptical, slotted, square, rectangular, polygonal, or may have any other shape known in the art. Holes 70 may be through holes or may be threaded to receive one of more connectors 72 (see FIG. 3) for attaching top portion 40 with bottom portion 42. Top portion 40 and bottom portion 42 may be made of metal. It is also contemplated that top portion 40 and bottom portion 42 may be made out of materials such as ceramic, fiberglass, plastic, polymer, Bakelite, or any other insulating materials known in the art. In one exemplary embodiment, top portion 40 and bottom portion 42 may be attached to each other via for example, an adhesive, by welding, by brazing, or by any other method of bonding surfaces known in the art.

Device 34 may include a variety of electronic components designed to receive and record various types of data. In one exemplary embodiment, device 34 may include at least a controller 74, one or more storage devices 76, and one or more pads 78. Controller 74 of device 34 may embody one or more flash memory controllers, a single microprocessor or multiple microprocessors, field programmable gate arrays (FPGAs), digital signal processors (DSPs), etc. that include a means for controlling the receiving and recording of the various types of data. Numerous commercially available microprocessors can be configured to perform the functions of controller 74. Controller 74 may communicate with the general machine control system microprocessor via data links or other methods. Various other known devices may be associated with controller 74, including power supply circuitry, signal-conditioning circuitry, actuator driver circuitry (i.e., circuitry powering solenoids, motors, or piezo actuators), communication circuitry, and other appropriate circuitry. Controller 74 may be further configured to process the data, including converting incoming data into a particular format, storing the data, and performing logical computations if necessary to determine appropriate actions.

Storage device 76 may include Random Access Memory (RAM) devices, NOR or NAND flash memory devices, hard drives, solid state drives, etc. Storage device 76 may be configured to store data or one or more instructions and/or software programs that perform functions or operations when executed by the one or more controllers 74. Although FIG. 2 illustrates only one controller 74 and only two storage devices 76, device 34 may include any number of controllers 74 and storage devices 76.

Device 34 may also include one or more pads 78. In one exemplary embodiment, pads 78 may include a copper plated region configured to facilitate attachment of wires 36. It is contemplated, however, that pads 78 may be plated with other materials, for example, silver, gold, etc. It is also contemplated that pads 78 may be square, rectangular, circular, or may have any other shape known in the art. In one exemplary embodiment, wires 36 may be attached to pads 78 using solder material. It is contemplated that the solder material may include readily available leaded or lead-free solders containing tin, lead, copper, silver, bismuth, indium, zinc, or other soldering materials well known in the art.

Figure 3:
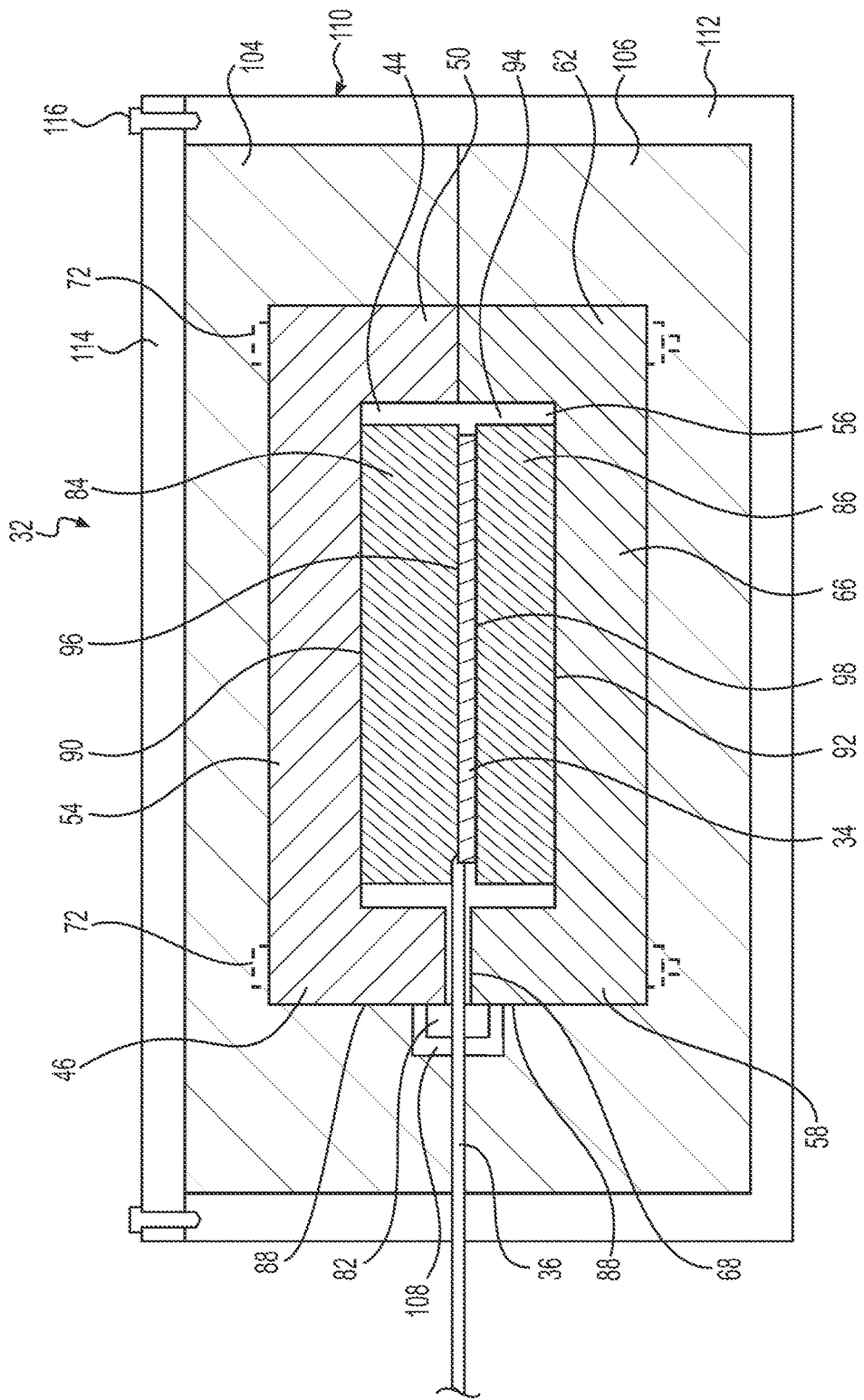
FIG. 3 is diagrammatic view of a cross-section of the exemplary disclosed memory module of FIG. 2.

FIG. 3 illustrates a diagrammatic view of a vertical cross-section of an exemplary disclosed memory module 30. As illustrated in FIG. 3, thermal wiring disconnect system 80 may include stopper 82, first filler portion 84, and second filler portion 86. Stopper 82 may be located outside enclosure 32 and may be attached to and/or disposed around the one or more wires 36. Stopper 82 may have a size larger than orifice 68 so that stopper 82 may not pass through orifice 68. In one exemplary embodiment, stopper 82 may be located so as to abut an outer surface 88 of enclosure 32. Stopper 82 may include, for example, a knot in the one or more wires 36, a bead, a grommet, a washer, a crimp, etc. When stopper 82 takes the form of a bead, grommet, or a washer, stopper 82 may have a hole sized so that stopper 82 forms a tight fit with wires passing through the hole. In this configuration, wires 36 may move together with stopper 82 because of frictional forces between stopper 82 and wires 36. In one exemplary embodiment, stopper 82 may be attached to wires 36 using an adhesive.

First filler portion 84 of thermal wiring disconnect system 80 may be disposed in upper recess 44 of top portion 40. It is contemplated that first filler portion 84 may have a surface, which may readily adhere to an inner surface 90 of top wall 54 of top portion 40. Second filler portion 86 of thermal wiring disconnect system 80 may be disposed in lower recess 56 of bottom portion 42. It is contemplated that like first filler portion 84, second filler portion 86 may have a surface, which may readily adhere to an inner surface 92 of bottom wall 66 of bottom portion 42. First filler portion 84 and second filler portion 86 may each have a rectangular, circular, polygonal or any other shape known in the art. First filler portion 84 and second filler portion 86 may be sized so as to leave a gap 94 with respect to one or more of side walls 46, 48, 50, 52, 58, 60, 62, 64. First filler portion 84 and second filler portion 86 may have a thickness about equal to or different from a depth of upper and lower recesses 44 and 56, respectively. First filler portion 84 may be disposed on first side 96 of device 34 and second filler portion 86 may be disposed on second side 98 of device 34 opposite first side 96. In one exemplary embodiment, first filler portion 84 and second filler portion 86 may be in contact with device 34. It is contemplated, however, that first filler portion 84 and second filler portion 86 may be disposed in upper recess 44 and lower recess 56, respectively, such that an air gap may be formed between first and second filler portions 84, 86 and first and second sides 96, 98, respectively, of device 34. In one exemplary embodiment, the air gap may have a thickness of about 5 to 10 mils. In another exemplary embodiment, first filler portion 84 and second filler portion 86 may be sized to occupy about 30% to 60% of upper recess 44 and lower recess 56, respectively. In yet another exemplary embodiment, first filler portion 84 and second filler portion 86 may be sized so that upon assembly, first filler portion 84, second filler portion 86, and device 34 may occupy about 50% to 80% of a combined volume of upper and lower recesses 44, 56. Although FIGS. 2 and 3 illustrate first filler portion 84 separate from second filler portion 86, it is contemplated that first or second filler portion 84, 86 may be wrapped around device 34 as a filler 84 or 86 so as to occupy both upper recess 44 and lower recess 56. It is also contemplated that device 34 wrapped with first or second filler portion 84, 86 may, for example, occupy about 50% to 80% of the combined volume of upper and lower recesses 44, 56.

First filler portion 84 and second filler portion 86 may be made of the same material or different materials. First filler portion 84 and second filler portion 86 may also have surfaces which may be tacky and may adhere to inner surfaces 90, 92 of top wall 54 and bottom wall 66, respectively. It is contemplated, however, that first and second filler portions 84, 86 may also adhere to one or more of side walls 46, 48, 50, 52, 58, 60, 62, 64 of enclosure 32. First and second filler portions 84, 86 may be sheets or strips of a thermally conductive filler material used to evenly distribute thermal energy that reaches the electronic components of the memory module. First filler portion 84 and second filler portion 86 may have a relatively lower thermal conductivity compared to a thermal conductivity of top portion 40 and bottom portion 42. In one exemplary embodiment, first and second filler portions 84, 86 may be made of a thermal clay, having a thermal conductivity of about 0.5 to 2 W/mK. In another exemplary embodiment, first and second filler portions 84, 86 may be made of a material having a thermal conductivity of about 1.6 W/mK.

First filler portion 84 and second filler portion 86 may be configured to expand in volume when subjected to a threshold temperature. Upon expansion, first filler portion 84 and/or second filler portion 86 may be configured to be ejected out of enclosure 32 via orifice 68, and to push stopper 82 outward and away from outer surface 88 of enclosure 32. Pushing stopper 82 away from outer surface 88 may push wires 36 outward and disconnect wires 36 from pads 78. In one exemplary embodiment, the threshold temperature may be about 250° F. to 370° F. In another exemplary embodiment, the volume of first and second filler portions 84, 86 may increase by about 2 to 5 times an initial volume of first and second filler portions 84, 86 when subjected to a threshold temperature of about 250° F. to 370° F. or higher.

As further illustrated in FIG. 3, memory module 30 may include a housing 110. Housing 110 may include upper insulator 104, lower insulator 106, housing base 112 and a lid 114. Enclosure 32 may be disposed between upper insulator 104 and lower insulator 106 in housing 110. Upper and lower insulators 104, 106 may include a recess 108 that may allow stopper 82 to be moved away from outer surface 88 when first and/or second filler portion 84, 86 expands and is ejected out of orifice 68. Upper and lower insulators 104, 106 may be made of thermally insulating materials such as ceramic, fiberglass, plastic, polymer, Bakelite, microporous insulation such as silica, or any other insulating materials known in the art. Lid 114 may be fixedly connected to housing base 112 via connectors 116. Connectors 116 may be screws, nuts, rivets, or any other type of connector known in the art. It is contemplated, however, that lid 114 may be fixedly connected to housing base 112 using adhesives, welding, brazing, or any other method known in the art. Housing 110 may have a cuboidal or cylindrical shape. It is contemplated that housing 110 may be an elliptical pyramid, polygonal pyramid, or may have any other shape known in the art. Housing 110 may be made of metal.

An exemplary operation and an exemplary method of manufacturing of memory module 30 with thermal wiring disconnect system 80 will be described next.

INDUSTRIAL APPLICABILITY

The disclosed memory module with a thermal wiring disconnect system may be used in any machine or power system application where it is beneficial to safeguard devices within the memory module from being damaged or destroyed by exposure to high temperatures. The disclosed thermal wiring disconnect system may find particular applicability with mobile machines such as locomotives, when such machines are involved in an accident accompanied by a fire. The disclosed thermal wiring disconnect system may provide an improved method for protecting devices within the memory module from being damaged or destroyed by exposure to high temperatures caused by the fire. For example, the disclosed thermal wiring disconnect system may provide an improved method for disconnecting wires connected to devices or electronic components in the memory module to prevent heat generated by the fire from being conducted by the wires from outside the memory module to devices and electronic components within the memory module.

In particular, when machine 10 is involved in an accident, fuel from fuel tank 20 may spill, ignite, and start a fire. Memory module 30 may be subjected to high temperatures because of the fire. For example, memory module 30 may be subjected to temperatures as high as 1400° F. Wires 36 may conduct heat produced by the fire from outside enclosure 32 to pads 78 on device 34. As pads 78 heat up, solder attaching wires 36 to pads 78 may soften and/or melt. First and second filler portions 84, 86 may also volumetrically expand when subjected to the high temperatures resulting from the fire. Initially first and second filler portions 84, 86 may expand and fill up orifices 68 and/or any gaps within upper and lower recesses 44 and 56. Further expansion of first and second filler portions 84, 86 may cause the material constituting the first and/or second filler portion 84, 86 to be ejected out from enclosure 32 through orifice 68. When the material constituting first and/or second filler portion 84, 86 is ejected out of orifice 68, the material may push against stopper 82, moving stopper 82 away from outer surface 88 of enclosure 32. As stopper 82 moves away from outer surface 88 of enclosure 32, stopper 82 may also move wires 36 outward from enclosure 32 and away from pads 78.

Softening of solder connecting wires 36 to pads 78 may help wires 36 to move away from pads 78, thereby disconnecting wires 36 from pads 78. Disconnecting wires 36 from pads 78 may prevent conduction of heat from outside enclosure 32 to device 34 and prevent damage or destruction of device 34 or of any data stored in storage devices 76 or in other electronic components associated with device 34. The disclosed thermal wiring disconnect system 80 may function without the need for any external power source and wires 36 may be disconnected from device 34 regardless of whether current or voltage may be applied to device 34. A method of manufacture of memory module 30 with thermal wiring disconnect system 80 will now be described.

Figure 4:
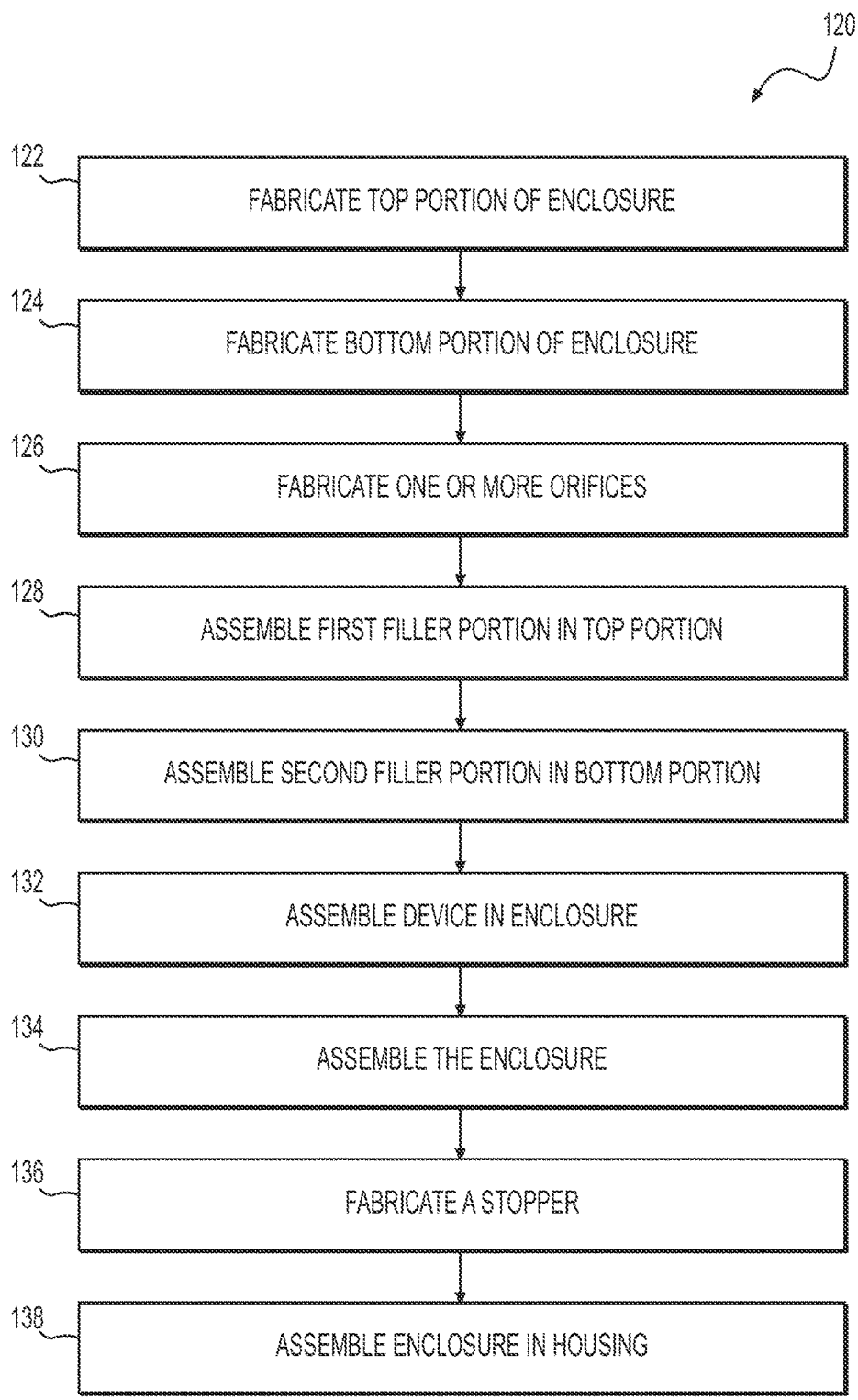
FIG. 4 is a flow chart illustrating an exemplary method of manufacture for the disclosed memory module of FIG. 2.

FIG. 4 illustrates an exemplary method 120, which may be performed for a manufacture of memory module 30 with thermal wiring disconnect system 80. Process 120 may include a step 122 of fabricating a top portion 40 of enclosure 32. Fabricating top portion 40 may involve machining top portion 40 out of metal or any other material selected for the manufacture of enclosure 32. Fabricating top portion 40 may include machining upper recess 44 and holes 70 in top portion 40. Upper recess may be formed, for example, by milling, laser cutting, or any other material removal process known in the art. Holes 70 may be formed by processes such as mechanical drilling, laser drilling, threading, and/or any other process used for fabricating holes 70 known in the art. It is also contemplated that top portion 40, including upper recess 44 and holes 70, may be fabricated using casting, injection molding, pressing, or any other forming process known in the art. Process 120 may include a step 124 of fabricating bottom portion 42 of enclosure 32. Fabricating bottom portion 42 may involve materials and processes similar to those disclosed above with respect to step 122.

Process 120 may include a step 126 of fabricating one or more orifices 68. Orifice 68 may be fabricated by machining orifice 68 in one or more of side walls 46, 48, 50, 52, 58, 60, 62, 64, top wall 54, and/or bottom wall 66. Machining orifice 68 may include processes such as mechanical drilling, laser drilling, milling, and/or any other process used for fabricating orifices known in the art. In one exemplary embodiment, orifice 68 may be formed while forming top and/or bottom portion 40, 42 using casting, injection molding, metal forming, etc.

Process 120 may include a step 128 of assembling first filler portion 84 in top portion 40. Assembling first filler portion 84 may include cutting first filler portion 84 from a sheet of material to an appropriate size and placing first filler portion 84 in upper recess 44 so as to leave a gap 94 between first filler portion 84 and one or more of side walls 46, 48, 50, 52. In one exemplary embodiment, first filler portion 84 may be sized to occupy about 30% to 60% of a volume of upper recess 44.

Process 120 may include a step 130 of assembling second filler portion 86 in bottom portion 42 of enclosure 32. Assembling second filler portion 86 may include cutting second filler portion 86 from a sheet of material to an appropriate size and placing second filler portion 86 in lower recess 56 so as to leave a gap 94 between second filler portion 86 and one or more of side walls 58, 60, 62, 64. In one exemplary embodiment, second filler portion 86 may be sized to occupy about 30% to 60% of a volume of lower recess 56.

Process 120 may include a step 132 of assembling device 34 in enclosure 32. Assembling device 34 may include placing device 34 on first filler portion 84 or second filler portion 86 within enclosure 32. Assembling device 34 may also include attaching at least one end of the one or more wires 36 to one or more pads 78, respectively, of device 34. Attaching the at least one end may include a process of soldering the one or more wires 36 to pads 78 using soldering processes well-known in the art. It is contemplated that attaching the at least one end may include a process of brazing, spot welding, ultrasonic welding, or any other process of attaching wires to an electronic circuit known in the art. Assembling device 34 may further include passing the unattached distal ends of wires 36 through orifice 68 to allow wires 36 to exit enclosure 32 of memory module 30. Passing wires 36 through orifice 68 may include twisting the one or more wires 36 into a twisted wire combination, which may then be allowed to pass out of orifice 68.

Process 120 may include a step 134 of assembling enclosure 32. Assembling enclosure 32 may include placing top portion 40 with first filler portion 84 disposed in upper recess 44 on second filler portion 86 so that device 34 is sandwiched between first filler portion 84 and second filler portion 86. Assembling enclosure 32 may also include fixedly attaching top portion 40 and bottom portion 42 using connectors 72 inserted in holes 70. It is contemplated, however, that in some exemplary embodiments, top portion 40 and bottom portion 42 may be fixedly attached to each other using an adhesive or by, for example, welding or brazing the top and bottom portions 40, 42.

Process 120 may include a step 136 of fabricating stopper 82 on wires 36. Fabricating stopper 82 may include, for example, assembling stopper 82 having a hole onto wires 36 by passing wires 36 through the hole in stopper 82 and locating stopper 82 so that a surface of stopper 82 abuts an outer surface 88 of enclosure 32. In one exemplary embodiment, assembling stopper 82 may further include fixedly attaching stopper 82 to wires 36 using, for example, an adhesive. In another exemplary embodiment, fabricating stopper 82 may include tying the one or more wires into a knot having a size larger than orifice 68 and locating the knot so as to abut outer surface 88 of enclosure 32. In yet another exemplary embodiment, fabricating stopper 82 may include crimping the one or more wires 36 so that a crimped portion of wires 36 has a size larger than orifice 68 and is located so as to abut outer surface 88 of enclosure 32. It is also contemplated that more than one of a knot, grommet, bead, crimp etc. may be implemented in fabricating stopper 82. For example, wires 36 may be passed through a hole in a grommet located so as to abut outer surface 88 of enclosure 32 and the wires may crimped or tied into a knot on the other end of the grommet not touching outer surface 88. In some exemplary embodiments, a bead may be used in a similar manner instead of a grommet.

Process 120 may include a step 138 of assembling enclosure 32 in housing 110. Assembling enclosure 32 in housing 110 may include using an arbor press to push lower insulator 106 into housing base 112. Assembling enclosure 32 in housing 110 may also include placing enclosure 32 in a recess in lower insulator 106. Further, assembling enclosure 32 in housing 110 may include using an arbor press to push upper insulator 104 into housing base 112 so that upper insulator 104 covers enclosure 32. One skilled in the art would recognize that electrical, pneumatic, or hydraulic presses and/or clamps, etc. may be used to assemble upper insulator 104 and lower insulator 106 in housing base 112. Assembling enclosure 32 in housing 110 may also include attaching lid 114 to housing base 112 using connectors 116. It is contemplated, however, that in some exemplary embodiments, lid 114 and housing base 112 may be fixedly attached to each other using an adhesive or by, for example, welding or brazing lid 114 and housing base 112. In one exemplary embodiment, upper insulator 104 and lower insulator 106 may be held together by pressure applied by lid 118 and/or an interference fit between housing base 112 and upper and/or lower insulators 104, 106.

It will be apparent to those skilled in the art that various modifications and variations can be made to the disclosed crashworthy memory module without departing from the scope of the disclosure. Other embodiments of the disclosed crashworthy memory module will be apparent to those skilled in the art from consideration of the specification and practice of the disclosed crashworthy memory module disclosed herein. It is intended that the specification and examples be considered as exemplary only, with a true scope of the disclosure being indicated by the following claims and their equivalents.

What is claimed is:

1. A memory module, including:
    an enclosure;
    a device disposed within the enclosure;
    an orifice in a wall of the enclosure;
    a wire passing through the orifice, one end of the wire being attached to the device;
    a stopper attached to the wire, the stopper being located abutting an outer surface of the enclosure; and
    a filler disposed within the enclosure and disposed on the device, the filler being configured to:
        expand and be ejected out of the orifice when subjected to a threshold temperature;
        push the stopper away from the outer surface; and
        disconnect the wire from the device.

2. The memory module of claim 1, wherein the one end of the wire is soldered to a pad on the device.

3. The memory module of claim 1, wherein the stopper comprises at least one of a knot, a bead, a grommet, and a crimp.

4. The memory module of claim 1, wherein the filler is wrapped around the device.

5. The memory module of claim 1, wherein the enclosure includes:
    a top portion having an upper recess; and
    a bottom portion having a lower recess, the bottom portion being configured to be fixedly attached to the top portion.

6. The memory module of claim 5, wherein the filler comprises:
    a first filler portion disposed in the upper recess; and
    a second filler portion disposed in the lower recess.

7. The memory module of claim 6, further including the device disposed in the enclosure such that:
    the first filler portion is disposed adjacent a first side of the device; and
    the second filler portion is disposed adjacent a second side of the device opposite the first side.

8. The memory module of claim 1, wherein the filler occupies about 30% to 60% of a volume of the enclosure.

9. The memory module of claim 1, wherein the filler comprises a thermal clay having a thermal conductivity of about 0.5 to 2 W/mK.

10. A thermal wiring disconnect system for a device disposed within an enclosure, comprising:
    a stopper attached to a wire connected to the device, the wire exiting the enclosure through an orifice and the stopper being located adjacent an outer surface of the enclosure; and
    a filler disposed within the enclosure and disposed on the device, the filler being configured to:

expand and be ejected through the orifice when subjected to a threshold temperature;
push the stopper away from the outer surface; and
disconnect the wire from the device.

11. The thermal wiring disconnect system of claim 10, wherein the wire is soldered to a pad on the device.

12. The thermal wiring disconnect system of claim 10, wherein the stopper comprises at least one of a knot, a bead, a grommet, and a crimp.

13. The thermal wiring disconnect system of claim 10, wherein the filler is wrapped around the device within the enclosure.

14. The thermal wiring disconnect system of claim 10, wherein the filler comprises a thermal clay.

15. The thermal wiring disconnect system of claim 14, wherein the thermal clay is configured to expand by about 2 to 5 times an initial volume of the thermal clay when the thermal clay is subjected to the threshold temperature.

16. The thermal wiring disconnect system of claim 10, wherein the threshold temperature ranges from about 250° F. to 370° F.

* * * * *